United States Patent
Cohen et al.

(10) Patent No.: US 10,249,052 B2
(45) Date of Patent: Apr. 2, 2019

(54) STEREO CORRESPONDENCE MODEL FITTING

(71) Applicant: Adobe Inc., San Jose, CA (US)

(72) Inventors: Scott D. Cohen, Sunnyvale, CA (US); Brian L. Price, San Jose, CA (US); Chenxi Zhang, Lexington, KY (US)

(73) Assignee: Adobe Systems Incorporated, San Jose, CA (US)

( * ) Notice: Subject to any disclaimer, the term of this patent is extended or adjusted under 35 U.S.C. 154(b) by 1249 days.

(21) Appl. No.: 13/720,316

(22) Filed: Dec. 19, 2012

(65) Prior Publication Data

US 2014/0168215 A1   Jun. 19, 2014

(51) Int. Cl.
  *G06T 7/593* (2017.01)
  *G06T 17/10* (2006.01)
  *G06T 17/00* (2006.01)

(52) U.S. Cl.
  CPC .............. *G06T 7/593* (2017.01); *G06T 17/00* (2013.01); *G06T 17/10* (2013.01); *G06T 2200/04* (2013.01)

(58) Field of Classification Search
  CPC ....... G06T 17/00; G06T 7/0075; G06T 7/593; G06T 17/10; G06T 2200/04
  See application file for complete search history.

(56) References Cited

U.S. PATENT DOCUMENTS

| | | | |
|---|---|---|---|
| 4,550,425 A | 10/1985 | Andersen et al. | |
| 4,591,928 A | 5/1986 | Bloom et al. | |
| 5,151,998 A | 9/1992 | Capps | |
| 5,305,420 A | 4/1994 | Nakamura et al. | |
| 5,583,977 A | 12/1996 | Seidl | |
| 5,652,828 A | 7/1997 | Silverman | |
| 5,671,283 A | 9/1997 | Michener et al. | |
| 5,717,818 A | 2/1998 | Nejime et al. | |
| 5,808,616 A | 9/1998 | Shimizu | |
| 6,122,375 A | 9/2000 | Takaragi et al. | |
| 6,208,348 B1 | 3/2001 | Kaye | |
| 6,266,412 B1 | 7/2001 | Berenzweig et al. | |
| 6,316,712 B1 | 11/2001 | Laroche | |
| 6,333,983 B1 | 12/2001 | Enichen | |
| 6,370,247 B1 | 4/2002 | Takaragi et al. | |
| 6,480,957 B1 | 11/2002 | Liao et al. | |
| 6,750,873 B1 | 6/2004 | Bernardini et al. | |
| 6,778,667 B1 | 8/2004 | Bakhle et al. | |
| 6,792,113 B1 | 9/2004 | Ansell et al. | |

(Continued)

FOREIGN PATENT DOCUMENTS

| EP | 1008112 | 3/2005 |
|---|---|---|
| WO | WO-2010086317 | 8/2010 |

OTHER PUBLICATIONS

"Non-Final Office Action", U.S. Appl. No. 13/681,643, dated Jan. 7, 2015, 10 pages.

(Continued)

*Primary Examiner* — Maria E Vazquez Colon
(74) *Attorney, Agent, or Firm* — Wolfe-SBMC

(57) ABSTRACT

Stereo correspondence model fitting techniques are described. In one or more implementations, a model may be fit to a region in at least one of a plurality of stereoscopic images of an image scene. The model may then be used as part of a stereo correspondence calculation, which may include computing disparities for the region based at least in part on correspondence to the model.

20 Claims, 10 Drawing Sheets

(56) References Cited

U.S. PATENT DOCUMENTS

| | | |
|---|---|---|
| 6,804,355 B1 | 10/2004 | Graunke |
| 7,003,107 B2 | 2/2006 | Ananth |
| 7,103,181 B2 | 9/2006 | Ananth |
| 7,130,467 B1 | 10/2006 | Bronder et al. |
| 7,142,669 B2 | 11/2006 | Dworkin et al. |
| 7,200,226 B2 | 4/2007 | Bace |
| 7,213,156 B2 | 5/2007 | Fukuda |
| 7,218,733 B2 | 5/2007 | Li et al. |
| 7,221,756 B2 | 5/2007 | Patel et al. |
| 7,224,357 B2 | 5/2007 | Chen et al. |
| 7,269,664 B2 | 9/2007 | Hutsch et al. |
| 7,269,854 B2 | 9/2007 | Simmons et al. |
| 7,350,070 B2 | 3/2008 | Smathers et al. |
| 7,400,744 B2 | 7/2008 | Nichani et al. |
| 7,412,060 B2 | 8/2008 | Fukuda |
| 7,418,100 B2 | 8/2008 | McGrew et al. |
| 7,536,016 B2 | 5/2009 | Benaloh |
| 7,603,563 B2 | 10/2009 | Ansell et al. |
| 7,636,691 B2 | 12/2009 | Maari |
| 7,672,840 B2 | 3/2010 | Sasaki et al. |
| 7,680,269 B2 | 3/2010 | Nicolai et al. |
| 7,693,278 B2 | 4/2010 | Hiramatsu |
| 7,715,591 B2 | 5/2010 | Owechko et al. |
| 7,757,299 B2 | 7/2010 | Robert et al. |
| 7,827,408 B1 | 11/2010 | Gehringer |
| 7,836,311 B2 | 11/2010 | Kuriya et al. |
| 7,861,312 B2 | 12/2010 | Lee et al. |
| 7,884,854 B2 | 2/2011 | Banner et al. |
| 7,924,323 B2 | 4/2011 | Walker et al. |
| 8,051,287 B2 | 11/2011 | Shetty et al. |
| 8,082,592 B2 | 12/2011 | Harris |
| 8,095,795 B2 | 1/2012 | Levy |
| 8,099,519 B2 | 1/2012 | Ueda |
| 8,103,505 B1 | 1/2012 | Silverman et al. |
| 8,130,952 B2 | 3/2012 | Shamoon et al. |
| 8,134,637 B2 | 3/2012 | Rossbach et al. |
| 8,184,182 B2 | 5/2012 | Lee et al. |
| 8,189,769 B2 | 5/2012 | Ramasamy et al. |
| 8,199,216 B2 | 6/2012 | Hwang |
| 8,245,033 B1 | 8/2012 | Shetty et al. |
| 8,291,219 B2 | 10/2012 | Eto |
| 8,300,812 B2 | 10/2012 | Van De Ven |
| 8,315,396 B2 | 11/2012 | Schreiner et al. |
| 8,345,976 B2 | 1/2013 | Wang et al. |
| 8,355,565 B1 | 1/2013 | Yang et al. |
| 8,390,704 B2 | 3/2013 | Wang et al. |
| 8,417,806 B2 | 4/2013 | Chawla et al. |
| 8,428,390 B2 | 4/2013 | Li et al. |
| 8,447,098 B1* | 5/2013 | Cohen ................... G06T 7/0075 382/154 |
| 8,520,083 B2 | 8/2013 | Webster et al. |
| 8,543,386 B2 | 9/2013 | Oh et al. |
| 8,548,226 B2 | 10/2013 | Sakano et al. |
| 8,571,305 B2 | 10/2013 | Kao |
| 8,571,308 B2 | 10/2013 | Grafulla-González |
| 8,583,443 B2 | 11/2013 | Misawa |
| 8,586,847 B2 | 11/2013 | Ellis et al. |
| 8,615,108 B1 | 12/2013 | Stoppa et al. |
| 8,619,082 B1 | 12/2013 | Ciurea et al. |
| 8,694,319 B2 | 4/2014 | Bodin et al. |
| 8,731,913 B2 | 5/2014 | Zopf et al. |
| 8,738,633 B1 | 5/2014 | Sharifi et al. |
| 8,805,560 B1 | 8/2014 | Tzanetakis et al. |
| 8,855,334 B1 | 10/2014 | Lavine et al. |
| 8,879,731 B2 | 11/2014 | Schultz |
| 8,886,543 B1 | 11/2014 | Sharifi et al. |
| 8,903,088 B2 | 12/2014 | Schultz |
| 8,914,290 B2 | 12/2014 | Hendrickson et al. |
| 8,953,811 B1 | 2/2015 | Sharifi et al. |
| 9,064,318 B2 | 6/2015 | Price et al. |
| 9,076,205 B2 | 7/2015 | Cho et al. |
| 9,135,710 B2 | 9/2015 | Cohen et al. |
| 9,201,580 B2 | 12/2015 | King et al. |
| 9,208,547 B2 | 12/2015 | Cohen et al. |
| 9,214,026 B2 | 12/2015 | Price et al. |
| 9,355,649 B2 | 5/2016 | King et al. |
| 9,451,304 B2 | 9/2016 | King et al. |
| 2002/0081019 A1* | 6/2002 | Katayama ............... G06K 9/209 382/154 |
| 2002/0086269 A1 | 7/2002 | Shpiro |
| 2002/0154779 A1 | 10/2002 | Asano et al. |
| 2003/0028380 A1 | 2/2003 | Freeland et al. |
| 2004/0030656 A1 | 2/2004 | Kambayashi et al. |
| 2004/0122662 A1 | 6/2004 | Crockett |
| 2004/0184655 A1 | 9/2004 | Ziegler et al. |
| 2004/0254660 A1 | 12/2004 | Seefeldt |
| 2005/0015343 A1 | 1/2005 | Nagai et al. |
| 2005/0201591 A1 | 9/2005 | Kiselewich |
| 2005/0232463 A1 | 10/2005 | Hirvonen et al. |
| 2006/0045211 A1 | 3/2006 | Oh et al. |
| 2006/0078194 A1 | 4/2006 | Fradkin et al. |
| 2006/0122839 A1 | 6/2006 | Li-Chun Wang et al. |
| 2006/0165240 A1 | 7/2006 | Bloom et al. |
| 2006/0173846 A1 | 8/2006 | Omae et al. |
| 2006/0221072 A1 | 10/2006 | Se et al. |
| 2007/0041663 A1 | 2/2007 | Cho et al. |
| 2007/0061145 A1 | 3/2007 | Edgington et al. |
| 2007/0070226 A1 | 3/2007 | Matusik et al. |
| 2007/0087756 A1 | 4/2007 | Hoffberg |
| 2007/0098250 A1* | 5/2007 | Molgaard ............... G06F 3/011 382/154 |
| 2007/0132763 A1 | 6/2007 | Chu et al. |
| 2007/0291958 A1 | 12/2007 | Jehan |
| 2008/0036761 A1 | 2/2008 | Mazzanti |
| 2008/0120230 A1 | 5/2008 | Lebegue et al. |
| 2008/0246757 A1 | 10/2008 | Ito |
| 2009/0055139 A1 | 2/2009 | Agarwal et al. |
| 2009/0125726 A1 | 5/2009 | Iyer et al. |
| 2009/0195643 A1* | 8/2009 | Neuman ............... H04N 13/026 348/51 |
| 2009/0259684 A1 | 10/2009 | Knight et al. |
| 2009/0276628 A1 | 11/2009 | Cho et al. |
| 2009/0279697 A1 | 11/2009 | Schneider |
| 2009/0290710 A1 | 11/2009 | Tkachenko et al. |
| 2009/0290786 A1* | 11/2009 | Stevens ............... G01B 11/03 382/154 |
| 2009/0306972 A1 | 12/2009 | Opitz et al. |
| 2009/0307489 A1 | 12/2009 | Endoh |
| 2009/0315670 A1 | 12/2009 | Naressi et al. |
| 2010/0105454 A1 | 4/2010 | Weber |
| 2010/0153747 A1 | 6/2010 | Asnaashari et al. |
| 2010/0172567 A1 | 7/2010 | Prokoski |
| 2010/0208779 A1 | 8/2010 | Park et al. |
| 2010/0246816 A1 | 9/2010 | Thomas et al. |
| 2010/0257368 A1 | 10/2010 | Yuen |
| 2010/0279766 A1 | 11/2010 | Pliska et al. |
| 2010/0284607 A1 | 11/2010 | Van Den Hengel et al. |
| 2010/0295783 A1 | 11/2010 | El Dokor et al. |
| 2010/0322042 A1 | 12/2010 | Serletic et al. |
| 2011/0043864 A1 | 2/2011 | Tian et al. |
| 2011/0112670 A1 | 5/2011 | Disch et al. |
| 2011/0131219 A1 | 6/2011 | Martin-Cocher et al. |
| 2011/0161669 A1 | 6/2011 | Eto |
| 2011/0173208 A1 | 7/2011 | Vogel |
| 2011/0230987 A1 | 9/2011 | Anguera Miró et al. |
| 2012/0042167 A1 | 2/2012 | Marking et al. |
| 2012/0046954 A1 | 2/2012 | Lindahl et al. |
| 2012/0056982 A1 | 3/2012 | Katz et al. |
| 2012/0071239 A1* | 3/2012 | Graepel ............... G06K 9/00355 463/31 |
| 2012/0130822 A1 | 5/2012 | Patwa et al. |
| 2012/0173865 A1 | 7/2012 | Swaminathan |
| 2012/0173880 A1 | 7/2012 | Swaminathan |
| 2012/0216300 A1 | 8/2012 | Vivolo et al. |
| 2012/0219229 A1 | 8/2012 | Springer et al. |
| 2012/0321172 A1 | 12/2012 | Jachalsky et al. |
| 2013/0064443 A1 | 3/2013 | Schlosser et al. |
| 2013/0113881 A1 | 5/2013 | Barnum |
| 2013/0124148 A1 | 5/2013 | Jin |
| 2013/0127824 A1* | 5/2013 | Cohen et al. ................. 345/419 |
| 2013/0132733 A1 | 5/2013 | Agrawal et al. |
| 2013/0142330 A1 | 6/2013 | Schultz |
| 2013/0142331 A1 | 6/2013 | Schultz |
| 2013/0173273 A1 | 7/2013 | Kuntz et al. |

(56) References Cited

U.S. PATENT DOCUMENTS

| | | |
|---|---|---|
| 2013/0191491 A1 | 7/2013 | Kotha et al. |
| 2013/0243313 A1 | 9/2013 | Civit et al. |
| 2013/0243314 A1 | 9/2013 | Civit et al. |
| 2013/0290818 A1 | 10/2013 | Arrasvuori et al. |
| 2013/0343606 A1 | 12/2013 | Dal Mutto et al. |
| 2014/0023291 A1 | 1/2014 | Lin |
| 2014/0119643 A1 | 5/2014 | Price |
| 2014/0135962 A1 | 5/2014 | King et al. |
| 2014/0136976 A1 | 5/2014 | King et al. |
| 2014/0140626 A1 | 5/2014 | Cho |
| 2014/0142947 A1 | 5/2014 | King |
| 2014/0148933 A1 | 5/2014 | King |
| 2014/0152776 A1 | 6/2014 | Cohen |
| 2014/0153816 A1 | 6/2014 | Cohen |
| 2014/0169660 A1 | 6/2014 | Cohen |
| 2014/0177903 A1 | 6/2014 | Price |
| 2014/0201630 A1 | 7/2014 | Bryan |
| 2014/0310006 A1 | 10/2014 | Anguera Miro et al. |

OTHER PUBLICATIONS

"Non-Final Office Action", U.S. Appl. No. 13/675,807, dated Dec. 17, 2014, 18 pages.
"Supplemental Notice of Allowance", U.S. Appl. No. 13/310,032, dated Nov. 3, 2014, 4 pages.
"Final Office Action", U.S. Appl. No. 13/309,982, (dated Nov. 1, 2013), 34 pages.
"Final Office Action", U.S. Appl. No. 13/310,032, (dated Oct. 31, 2013), 21 pages.
Felzenszwalb, Pedro F., et al., "Efficient Belief Propagation for Early Vision", *International Journal of Computer Vision*, 70(1), (2006), pp. 41-54.
Gastal, Eduardo S., et al., "Shared Sampling for Real-Time Alpha Matting", *Eurographics 2010*, vol. 29, No. 2, (2010),10 pages.
He, Kaiming et al., "A Global Sampling Method for Alpha Matting", *CVPR 2011*, (2011),pp. 2049-2056.
Levin, Anat et al., "A Closed Form Solution to Natural Image Matting", *CVPR*, 2006, (2006), 8 pages.
Park, Youngja et al., "Extracting Salient Keywords from Instructional Videos Using Joint Text, Audio and Visual Cues", *Proceedings of the Human Language Technology Conference of the North American Chapter of the ACL*, Association for Computational Linguistics, 2006,(Jun. 2006), pp. 109-112.
Radhakrishnan, Regunathan et al., "A Content-Adaptive Analysis and Representation Framework for Audio Event Discovery from "Unscripted" Multimedia", Hindawi Publishing Corporation, *EURASIP Journal on Applied Signal Processing*, vol. 2006, Article ID 89013, (2006), 24 pages.
Smaragdis, Paris "A Probabilistic Latent Variable Model for Acoustic Modeling", *NIPS*, (2006), 6 pages.
Smaragdis, Paris "Supervised and Semi-Supervised Separation of Sounds from Single-Channel Mixtures", *ICA '07 Proceedings of the 7th international conference on Independent component analysis and signal separation*, (2007), 8 pages.
Smith, Alvy R., et al., "Blue Screen Matting", *SIGGRAPH 96 Conference Proceedings*, (Aug. 1996),10 pages.
Yang, Qingxiong et al., "A Constant-Space Belief Propagation Algorithm for Stereo Matching", *CVPR*, (2010), 8 pages.
"Adobe Audion", User Guide, 2003, 390 pages.
"Corrected Notice of Allowance", U.S. Appl. No. 13/660,159, dated Apr. 28, 2015, 2 pages.
"MPEG Surround Specification", International Organization for Standardization, Coding of Moving Pictures and Audio; ISO/IEF JTC 1/SC 29/WG 11; Bangkok, Thailand, Jan. 19, 2006, 186 pages.
"Non-Final Office Action", U.S. Appl. No. 13/675,711, dated Mar. 11, 2015, 14 pages.
"Non-Final Office Action", U.S. Appl. No. 13/688,421, dated Feb. 4, 2015, 18 pages.
"Non-Final Office Action", U.S. Appl. No. 13/690,755, dated Mar. 2, 2015, 8 pages.
"Non-Final Office Action", U.S. Appl. No. 13/720,258, dated Mar. 3, 2015, 14 pages.
"Non-Final Office Action", U.S. Appl. No. 13/722,825, dated Mar. 25, 2015, 17 pages.
"Notice of Allowance", U.S. Appl. No. 13/660,159, dated Mar. 10, 2015, 6 pages.
"Notice of Allowance", U.S. Appl. No. 13/680,952, dated Mar. 17, 2015, 6 pages.
"Restriction Requirement", U.S. Appl. No. 13/690,724, dated Feb. 26, 2015, 6 Pages.
Ioffe, "Improved Consistent Sampling, Weighted Minhash and L1 Sketching", ICDM '10 Proceedings of the 2010 IEEE International Conference on Data Mining, Dec. 2010, 10 pages.
Jehan, "Creating Music by Listening", In PhD Thesis of Massachusetts Institute of Technology, Retrieved from <http://web.media.mit.edu/~tristan/Papers/PhD_Tristan.pdf>,Sep. 2005, 137 pages.
Su, et al., "Over-Segmentation Based Background Modeling and Foreground Detection with Shadow Removal by Using Hierarchical MRFs", Proceedings of the 10th Asian conference on Computer vision—vol. Part III, Nov. 2010, 12 pages.
Yang, et al., "Stereo Matching with Color-Weighted Correlation, Hierarchical Belief Propagation, and Occlusion Handling", IEEE Transactions on Pattern Analysis and Machine Intelligence, vol. 31 Issue 3, Mar. 2009, 13 pages.
"Final Office Action", U.S. Appl. No. 12/852,349, (dated Nov. 19, 2012), 28 pages.
"Non-Final Office Action", U.S. Appl. No. 12/852,349, (dated Apr. 10, 2013), 26 pages.
"Non-Final Office Action", U.S. Appl. No. 12/852,349, (dated Jul. 5, 2012),17 pages.
"Non-Final Office Action", U.S. Appl. No. 13/309,982, (dated Jan. 17, 2013), 32 pages.
"Non-Final Office Action", U.S. Appl. No. 13/310,032, (dated Jan. 3, 2013),18 pages.
Breckon, et al., "Non-parametric 3D Surface Completion", *International Conference on 3D Digital Imaging and Modeling '05* (Jun. 13, 2005), 8 pages, (Jun. 13, 2005), 8 pages.
Curless, Brian et al., "A Volumetric Method for Building Complex Models from Range Images", *In SIGGRAPH*, ACM Press, (Aug. 4, 1996),10 pages.
Davis, et al., "Filling Holes in Complex Surfaces using Volumtric Diffusion", *International Symposium on 3D Data Processing Visualization and Transmission*. Jun. 19, 2002, 11 pages., (Jun. 19, 2002),11 pages.
Debevec, Paul E., et al., "Modeling and Rendering Architecture from Photographs: A Hybrid Geometry-and Image-Based Approach", *SIGGRAPH Conference Proceedings*, (Jan. 1996), pp. 1-10.
Goesele, Michael et al., "Multi-View Stereo Revisited", *Computer Vision and Pattern Recognition*, (2006), 8 pages.
He, et al., "Corner detector based on global and local curvature properties", Retrieved from <http://hub.hku.hk/bitstream/10722/57246/1/142282.pdf> on Dec. 21, 2012, (May 2008),13 pages.
Hirsch, et al., "Fast Removal of Non-uniform Camera Shake", Retrieved from <http://webdav.is.mpg.de/pixel/fast_removal_of_camera_shake/files/Hirsch_ICCV2011_Fast%20removal%20of%20non-uniform%20camera%20shake.pdf> on Dec. 21, 2012, 8 pages.
Jia, Jiaya "Single Image Motion Deblurring Using Transparency", Retrieved from <http://www.cse.cuhk.edu.hk/~leojia/all_final_papers/motion_deblur_cvpr07.pdf> on Dec. 21, 2012, 8 pages.
Levin, et al., "Image and Depth from a Conventional Camera with a Coded Aperture", *ACM Transactions on Graphics, SIGGRAPH 2007 Conference Proceedings*, San Diego, CA, Retrieved from <http://groups.csail.mit.edu/graphics/CodedAperture/CodedAperture-LevinEtAl-SIGGRAPH07.pdf> on Dec. 21, 2012,(2007), 9 pages.
Okutomi, Masatoshi et al., "A Multiple-Baseline Stereo", *IEEE Transactions on Pattern Analysis and Machine Intelligence*, vol. 15, No. 4, (Apr. 1993),11 pages.
Sharf, et al., "Context-based Surface Completion", *ACM Trans. Graph*. Aug. 2004, 10 pages, (Aug. 2004),10 pages.
Smith, et al., "Stereo Matching with Nonparametric Smoothness Priors in Feature Space", *CVPR 2009* (Jun. 22, 2009), 8 pages, (Jun. 22, 2009), 8 pages.

(56) References Cited

OTHER PUBLICATIONS

Yuan, et al., "Image Deblurring with Blurred/Noisy Image Pairs", *Proceedings of ACM SIGGRAPH*, vol. 26, Issue 3, (Jul. 2007),10 pages.
"Restriction Requirement", U.S. Appl. No. 13/660,159, dated Jun. 12, 2014, 6 pages.
"Notice of Allowance", U.S. Appl. No. 13/309,982, dated Jul. 30, 2014, 6 pages.
Kubo, Shiro et al., "Characterization of the Tikhonov Regularization for Numerical Analysis of Inverse Boundary Value Problems by Using the Singular Value Decomposition", *Inverse Problems in Engineering Mechanics*, 1998, (1998), pp. 337-344.
"Final Office Action", U.S. Appl. No. 12/852,349, (dated Sep. 13, 2013), 34 pages.
"Final Office Action", U.S. Appl. No. 13/690,755, dated Sep. 10, 2014, 7 pages.
"Non-Final Office Action", U.S. Appl. No. 13/660,159, dated Oct. 1, 2014, 7 pages.
"Non-Final Office Action", U.S. Appl. No. 13/680,952, dated Aug. 4, 2014, 8 pages.
"Notice of Allowance", U.S. Appl. No. 13/310,032, dated Aug. 26, 2014, 6 pages.
"Restriction Requirement", U.S. Appl. No. 13/722,825, dated Oct. 9, 2014, 7 pages.
Zhu, et al., "Fusion of Time-of-Flight Depth and Stereo for High Accuracy Depth Maps", IEEE Conference on Computer Vision and Pattern Recognition, Jun. 23, 2008, 8 pages.
"Time Domain Pitch Scaling using Synchronous Overlap and Add", retrieved from <http://homepages.inspire.net.nz/~jamckinnon/report/sola.htm> on Nov. 12, 2012, 3 pages.
"Waveform Similarity Based Overlap-Add (WSOLA)", retrieved from <http://www.pjsip.org/pjmedia/docs/html/group_PJMED_WSOLA.htm> on Nov. 12, 2012, 4 pages.
De Gotzen, Amalia et al., "Traditional (?) Implementations of a Phase-Vocoder: The Tricks of the Trade", *Proceedings of the COST G-6 Conference on Digital Audio Effects (DAFX-00)*, Verona, Italy, Dec. 7-9, 2000, retrieved from <http://128.112.136.35/courses/archive/spring09/cos325/Bernardini.pdf> on Nov. 12, 2012,(Dec. 7, 2000), 7 pages.
Dolson, Mark "The Phase Vocoder: A Tutorial", retrieved from <http://www.panix.com/~jens/pvoc-dolson.par> on Nov. 12, 2012, 11 pages.
Gutierrez-Osuna, Ricardo "L19: Prosodic Modificatin of Speech", Lecture based on [Taylor, 2009, ch. 14; Holmes, 2001, ch. 5; Moulines and Charpentier, 1990], retrieved from <http://research.cs.tamu.edu/prism/lectures/sp/l19.pdf> on Nov. 12, 2012, 35 pages.
Klingbeil, Michael "SPEAR: Sinusoidal Partial Editing Analysis and Resynthesis", retrieved from <http://www.klingbeil.com/spear/> on Nov. 12, 2012, 3 pages.
McAulay, R. J., et al., "Speech Processing Based on a Sinusoidal Model", *The Lincoln Laboratory Journal*, vol. 1, No. 2, 1998, retrieved from <http://www.II.mit.edu/publications/journal/pdf/vol01_no2/1.2.3.speechprocessing.pdf> on Nov. 12, 2012,(1988), pp. 153-168.
Moinet, Alexis et al., "PVSOLA: A Phase Vocoder with Synchronized Overlap-Add", *Proc. of the 14th Int. Conference on Digital Audio Effects (DAFx-11)*, Paris, France, Sep. 19-23, 2011, retrieved from <http://tcts.fpms.ac.be/publications/papers/2011/dafx2011_pvsola_amtd.pdf> on Nov. 12, 2012,(Sep. 19, 2011), 7 pages.
Patton, Joshua "ELEC 484 Project—Pitch Synchronous Overlap-Add", retrieved from <http://www.joshpatton.org/yeshua/Elec484/Elec484_files/ELEC%20484%20-%20PSOLA%20Final%20Project%20Report.pdf> on Nov. 12, 2012, 11 pages.
Rodet, Xavier "Musical Sound Signal Analysis/Synthesis: Sinusoidal+Residual and Elementary Waveform Models", *TFTS'97 (IEEE Time-Frequency and Time-Scale Workshop 97)*, Coventry, Grande Bretagne, août, 1997, retrieved from <http://articles.ircam.fr/textes/Rodet97e/index.html> on Nov. 12, 2012,(1997), 16 pages.
Roelands, Marc et al., "Waveform Similarity Based Overlap-Add (WSOLA) for Time-Scale Modification of Speech: Structures and Evaluation", retrieved from <http://citeseerx.ist.psu.edu/viewdoc/summary?doi=10.1.1.58.1356> on Nov. 12, 2012, 4 pages.
Serra, Xavier "A System for Sound Analysis/Transformation/Synthesis Based on a Deterministic Plus Stochastic Decomposition", retrieved from <https://ccrma.stanford.edu/files/papers/stanm58.pdf> on Nov. 12, 2012, (Oct. 1989), 166 pages.
Serra, Xavier "Approaches to Sinusoidal Plus Residual Modeling", retrieved from <http://www.dtic.upf.edu/~xserra/cursos/CCRMA-workshop/lectures/7-SMS-related-research.pdf> on Nov. 12, 2012, 21 pages.
Serra, Xavier "Musical Sound Modeling with Sinusoids Plus Noise", published in C. Roads, S. Pope, A. Picialli, G. De Poli, editors. 1997. "*Musical Signal Processing*". Swets & Zeitlinger Publishers, retrieved from <http://web.media.mit.edu/~tristan/Classes/MAS.945/Papers/Technical/Serra_SMS_97.pdf> on Nov. 12, 2012,(1997), 25 pages.
Smith III, Julius O., "MUS421/EE367B Applications Lecture 9C: Time Scale Modification (TSM) and Frequency Scaling/Shifting", retrieved from <https://ccrma.stanford.edu/~jos/TSM/TSM.pdf> on Nov. 12, 2012, (Mar. 8, 2012), 15 pages.
Upperman, Gina "Changing Pitch with PSOLA for Voice Conversion", retrieved from <http://cnx.org/content/m12474/latest/?collection=col10379/1.1> on Nov. 12, 2012, 1 page.
Verhelst, Werner "Overlap-Add Methods for Time-Scaling of Speech", retrieved from <http://citeseerx.ist.psu.edu/viewdoc/summary?doi=10.1.1.128.7991> on Nov. 12, 2012, 25 pages.
Verhelst, Werner et al., "An Overlap-Add Technique Based on Waveform Similarity (WSOLA) for High Quality Time-Scale Modification of Speech", retrieved <http://citeseerx.ist.psu.edu/viewdoc/download?doi=10.1.1.202.5460&rep=rep1&type=pdf> on Nov. 12, 2012, 4 pages.
"Non-Final Office Action", U.S. Appl. No. 12/852,349, dated Jan. 30, 2014, 35 pages.
"Non-Final Office Action", U.S. Appl. No. 13/309,982, dated Mar. 24, 2014, 35 pages.
"Non-Final Office Action", U.S. Appl. No. 13/310,032, dated Mar. 7, 2014, 21 pages.
"Non-Final Office Action", U.S. Appl. No. 13/690,755, dated Mar. 28, 2014, 7 pages.
Sinha, et al., "Interactive 3D Architectural Modeling from Unordered Photo Collections", ACM Transactions on Graphics, vol. 27, No. 5, Article 159, Dec. 2008, pp. 159:1-159:10.
"Corrected Notice of Allowance", U.S. Appl. No. 13/722,825, dated Sep. 21, 2015, 4 pages.
"Non-Final Office Action", U.S. Appl. No. 13/681,643, dated Oct. 16, 2015, 27 pages.
"Notice of Allowance", U.S. Appl. No. 13/675,807, dated Aug. 27, 2015, 6 pages.
"Notice of Allowance", U.S. Appl. No. 13/720,258, dated Sep. 18, 2015, 2 pages.
"Notice of Allowance", U.S. Appl. No. 13/722,825, dated Aug. 28, 2015, 10 pages.
"Supplemental Notice of Allowance", U.S. Appl. No. 13/690,755, dated Aug. 18, 2015, 4 pages.
Dueck,"Non-metric Affinity Propagation for Unsupervised Image Categorization", IEEE 11th International Conference on Computer Vision, 2007, Oct. 14, 2007, 8 pages.
Xiao,"Joint Affinity Propagation for Multiple View Segmentation", IEEE 11th International Conference on Computer Vision, 2007, Oct. 14, 2007, 7 pages.
"Corrected Notice of Allowance", U.S. Appl. No. 13/720,258, dated Nov. 13, 2015, 2 pages.
"Corrected Notice of Allowance", U.S. Appl. No. 13/722,825, dated Nov. 16, 2015, 4 pages.
"Final Office Action", U.S. Appl. No. 13/690,724, dated Dec. 10, 2015, 11 pages.
"Non-Final Office Action", U.S. Appl. No. 13/688,421, dated Jan. 7, 2016, 20 pages.
"Notice of Allowance", U.S. Appl. No. 13/675,711, dated Jan. 20, 2016, 11 pages.
"Adobe Audition 3.0 User Guide", 2007, 194 pages.
"Corrected Notice of Allowance", U.S. Appl. No. 13/660,159, dated May 29, 2015, 2 pages.

(56) References Cited

OTHER PUBLICATIONS

"Final Office Action", U.S. Appl. No. 13/675,711, dated Jun. 23, 2015, 14 pages.
"Final Office Action", U.S. Appl. No. 13/675,807, dated May 22, 2015, 24 pages.
"Final Office Action", U.S. Appl. No. 13/681,643, dated May 5, 2015, 14 pages.
"Final Office Action", U.S. Appl. No. 13/688,421, dated Jul. 29, 2015, 22 pages.
"Non-Final Office Action", U.S. Appl. No. 13/690,724, dated Jun. 18, 2015, 7 pages.
"Notice of Allowance", U.S. Appl. No. 13/690,755, dated Jun. 5, 2015, 6 pages.
"Notice of Allowance", U.S. Appl. No. 13/720,258, dated Jul. 24, 2015, 8 pages.
"Supplemental Notice of Allowance", U.S. Appl. No. 13/680,952, dated Jun. 11, 2015, 3 pages.
"Notice of Allowance", U.S. Appl. No. 13/688,421, dated Jun. 6, 2016, 10 pages.
"Corrected Notice of Allowance", U.S. Appl. No. 13/688,421, dated Aug. 22, 2016, 2 pages.
"Non-Final Office Action", U.S. Appl. No. 13/690,724, dated Apr. 5, 2016, 11 pages.
"Final Office Action", U.S. Appl. No. 13/681,643, dated Mar. 15, 2016, 25 pages.
"Non-Final Office Action", U.S. Appl. No. 13/690,724, dated Oct. 24, 2016, 13 pages.
"Non-Final Office Action", U.S. Appl. No. 13/681,643, dated Nov. 17, 2016, 23 pages.
"Final Office Action", U.S. Appl. No. 13/690,724, dated May 17, 2017, 15 pages.
"Final Office Action", U.S. Appl. No. 13/681,643, dated Apr. 12, 2017, 40 pages.
"Non-Final Office Action", U.S. Appl. No. 13/690,724, dated Dec. 1, 2017, 15 pages.
"Non-Final Office Action", U.S. Appl. No. 13/681,643, dated Oct. 20, 2017, 34 pages.
"Final Office Action", U.S. Appl. No. 13/681,643, dated May 4, 2018, 24 pages.
"Advisory Action", U.S. Appl. No. 13/681,643, dated Jul. 24, 2018, 3 pages.
"Non-Final Office Action", U.S. Appl. No. 13/690,724, dated Aug. 9, 2018, 8 pages.

* cited by examiner

800

802
Receive an indication that pixels correspond to each other, the pixels included in respective ones of a plurality of stereoscopic images

804
Compute the correspondence of the pixels automatically and without user intervention

806
Output a user interface that include the indication of the pixels that correspond to each other, the user interface configured to support user interaction to verify the correspondence

808
Output a user interface that is configured to support user interaction to generate the indication that the pixels correspond to each other

810
Fit a model to the plurality of stereoscopic images based at least in part on the indication of the correspondence of the one or more pixels to each other

812
Select the model from a plurality of models automatically and without user intervention

814
Output a user interface that is configured to support user interaction to select the model from a plurality of models

816
Calculate stereo correspondence of image data of the plurality of stereoscopic images, the calculating performed using disparities for pixels that are determined at least in part based on the model

*Fig. 8*

STEREO CORRESPONDENCE MODEL FITTING

BACKGROUND

Stereo correspondence calculations may be used to determine which parts in stereo images correspond to each other. For example, stereo images may be captured of a scene using an image capture device. The stereo images may then be processed to determine which points in the images correspond to each other. This may be utilized to support a variety of functionality, such as to determine depth of the scene from the images to perform three dimensional modeling of the scene, perform view synthesis, view interpolation, content manipulation, matting (e.g., object removal), support augmented reality (e.g., object insertion), and so on.

However, conventional techniques that were employed to perform this processing could encounter ambiguities that are not able to be resolved using the conventional techniques. This may include ambiguities caused by regions of the images that do not include textures or features (e.g., a white wall), repeated patterns (e.g., a checkerboard), shadows, view-point changes, and so on. Consequently, processing at these points in the image could fail using conventional techniques.

SUMMARY

Stereo correspondence model fitting techniques are described. In one or more implementations, a model may be fit to a region in at least one of a plurality of stereoscopic images of an image scene. The model may then be used as part of a stereo correspondence calculation, which may include computing disparities for the region based at least in part on correspondence to the model.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 8 is a flow diagram depicting a procedure in an example implementation in which a model is used as part of a calculation of stereo correspondence.

DETAILED DESCRIPTION

Overview

As previously described, conventional techniques may be ill suited to determine stereo correspondence when confronted with a variety of ambiguities. These ambiguities include lack of textures or features (e.g., a white wall), repeated patterns (e.g., a checkerboard), shadows, view-point changes, and so on. Accordingly, stereo correspondence at such locations in stereo images may be difficult to determine using conventional techniques.

Stereo correspondence model fitting techniques are described in which a model may be employed as part of a calculation of stereo correspondence of stereoscopic images. A model, for instance, may be fit to a region in one or more stereoscopic images. Calculation of disparities for pixels in that region may then be based at least in part on the model, such as through incorporation as part of a cost function, use of a weighting, and so on. In this way, the model may be used to bias values for the disparities of pixels in the region based on the model.

The region may be indicated in a variety of ways. For example, the region may be computed automatically and without user intervention based on features identified in the stereoscopic images. In another example, a user interface may be employed that supports user interaction to specify the region, such as by drawing a boundary, specifying individual points, and so on.

The model may also be selected in a variety of ways. For example, the model may also be selected automatically and without user intervention based on the region. In another example, a user interface may be employed that supports user interaction to select the model from a plurality of models. A variety of other examples are also contemplated, further discussion of which may be found in relation to the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
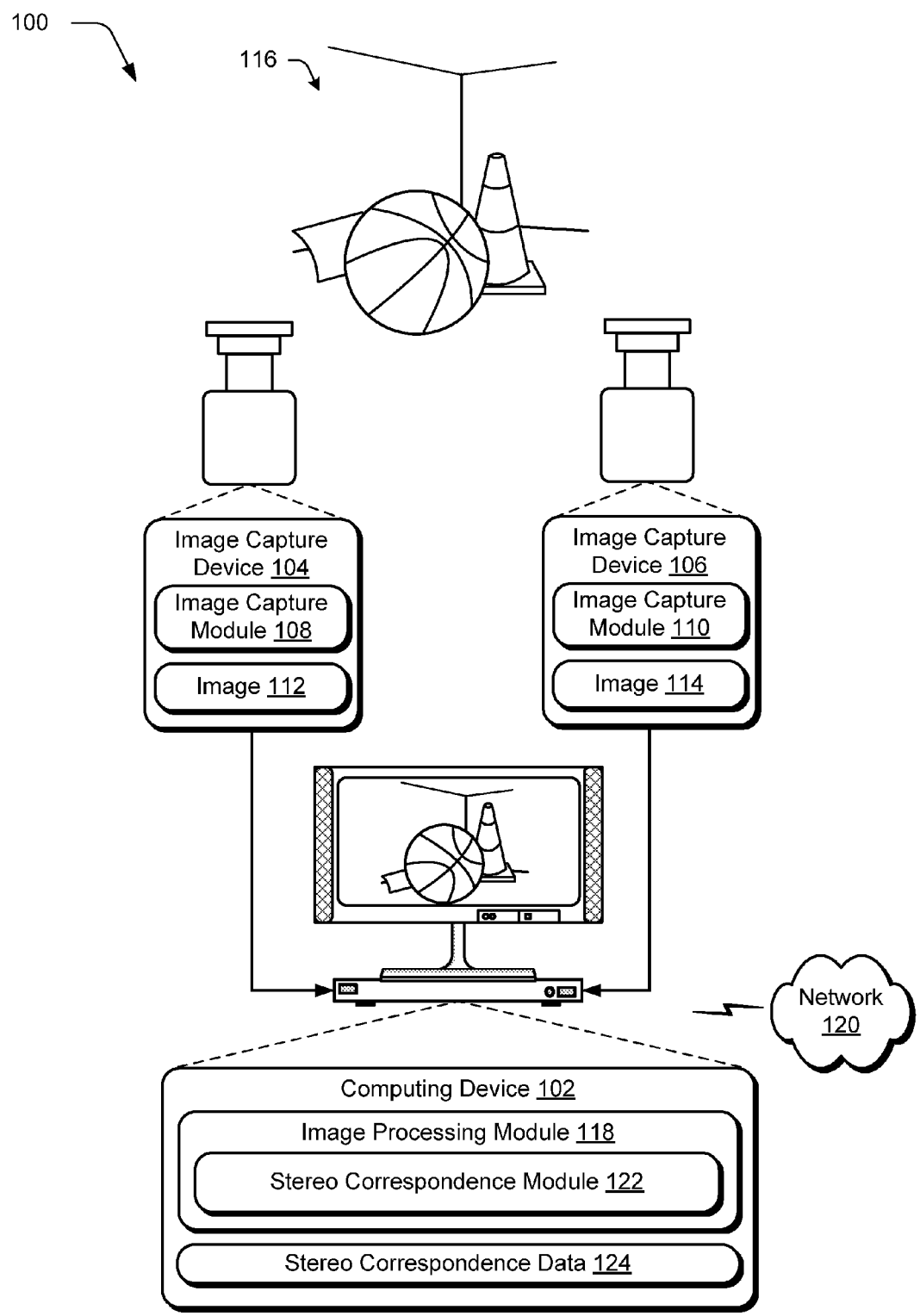
FIG. 1 is an illustration of an environment in an example implementation that is operable to employ techniques described herein involving model fitting.

FIG. 1 is an illustration of an environment 100 in an example implementation that is operable to employ techniques described herein. The illustrated environment 100 includes a computing device 102 and a plurality of image capture devices 104, 106, which may be configured in a variety of ways.

The computing device 102, for instance, may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 10.

The image capture devices 104, 106 may also be configured in a variety of ways. Illustrated examples of such configurations include a standalone camera such as a dedicated device, part of a mobile phone or tablet, and so on. Other examples are also contemplated. For example, each of the image capture devices 104, 106 may be configured as a single stereoscopic camera, scanner, copier, camera, mobile device (e.g., smart phone), and so forth. In another example, a single image capture device 104 may be used to capture multiple images of an image scene, such as the car, flag, and room as illustrated.

The image capture devices 104, 106 are illustrated as including a respective image capture module 108, 110. The image capture modules 108, 110 are representative of functionality to capture respective images 112, 114, such as by including image sensors and other hardware and software components to capture, process, and/or store images 112, 114.

The images 112, 114 in this example are stereoscopic in that the images are taken from different viewpoints of the illustrated image scene 116. For example, the images 112, 114 may be viewable by a user to gain a perception of three dimensional depth of the image scene. As previously described, the images 112, 114 may also be usable to model the image scene in three dimensions. This may be performed in a variety of ways as further described below.

The computing device 102 is illustrated as including an image processing module 118. The image processing module 118 is representative of functionality to perform one or more techniques that are usable to process an image. Although illustrated as implemented locally on the computing device, functionality of the image processing module may also be implemented in a distributed environment, remotely via a network 120 (e.g., "over the cloud") as further described in relation to FIG. 10, and so on.

An example of image processing that may be performed by the image processing module 118 is represented as a stereo correspondence module 122. The stereo correspondence the 122 is representative of functionality to generate stereo correspondence data 124, which may describe which pixels in stereoscopic images correspond to each other. The stereo correspondence data 122, for instance, may process images 112, 114 to determine depth of the image scene to perform three dimensional modeling, perform view synthesis, view interpolation, content manipulation, matting (e.g., object removal), support augmented reality (e.g., object insertion), and so on. This processing may be performed in a variety of ways, further description of which may be found in the following discussion and corresponding figure.

Figure 2:
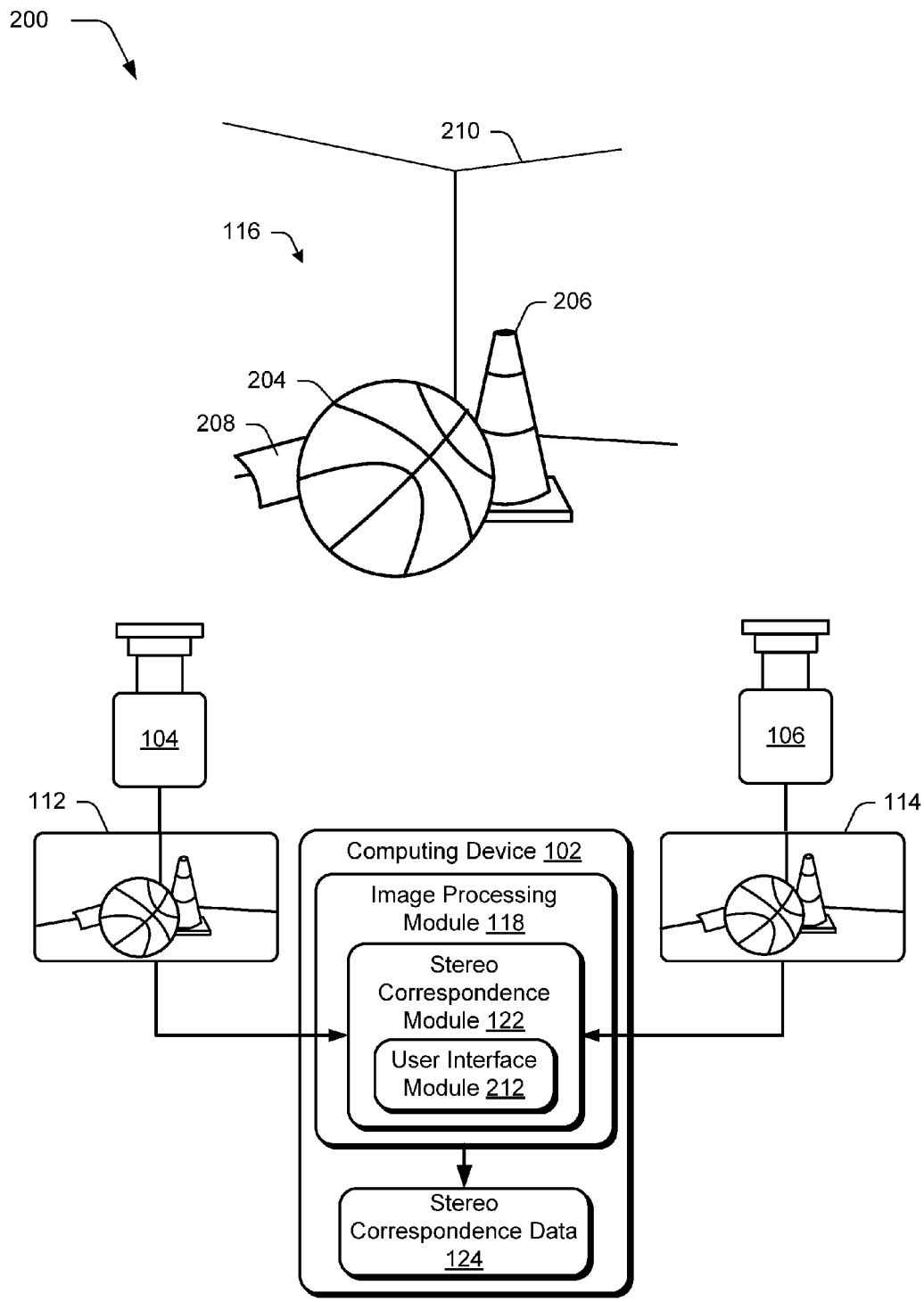
FIG. 2 depicts a system in an example implementation in which images are captured of an image scene and used in conjunction with a user interface to calculate stereo correspondence data.

FIG. 2 depicts a system 200 in an example implementation in which images 112, 114 are captured of an image scene 116 and used in conjunction with a user interface to calculate stereo correspondence data 124. The image scene 116 is illustrated as including a ball 204, a traffic cone 206, and a piece of paper 208 in a white-walled room 210. The image capture devices 104, 106 are illustrated as capturing stereoscopic images 112, 114 of the image scene 116. As previously described, the stereoscopic images may be leveraged for a variety of purposes, such as for three dimensional modeling, view interpolation, and so on.

To support this functionality, the image processing module 118 may employ a stereo correspondence module 122 to compute stereo correspondence data 124 that describes which pixels in the images 112, 114 correspond to each other. Conventional techniques that were utilized to perform this technique typically relied upon analysis of textures and features in the images 112, 114, solely. However, the images may include portions that cause ambiguities in these conventional techniques. The white walled room 210, for instance, may lack texture and features and therefore cause ambiguities. In another instance, the traffic cone 206 may cause identification of image edges due to differences in textures that are not indicative of a depth discontinuity.

Accordingly, the stereo correspondence data 122 may leverage a user interface module 212 that is representative of functionality to output a user interface that may be used to assist in the calculation of the stereo correspondence data 124. This assistance may be provided through use of a variety of tools. For example, a model fitting tool may be employed that may be used as part of a calculation for pixels in a region to which the model has been fit, further discussion of which may be found in relation to the following discussion and associated figure.

Figure 3:
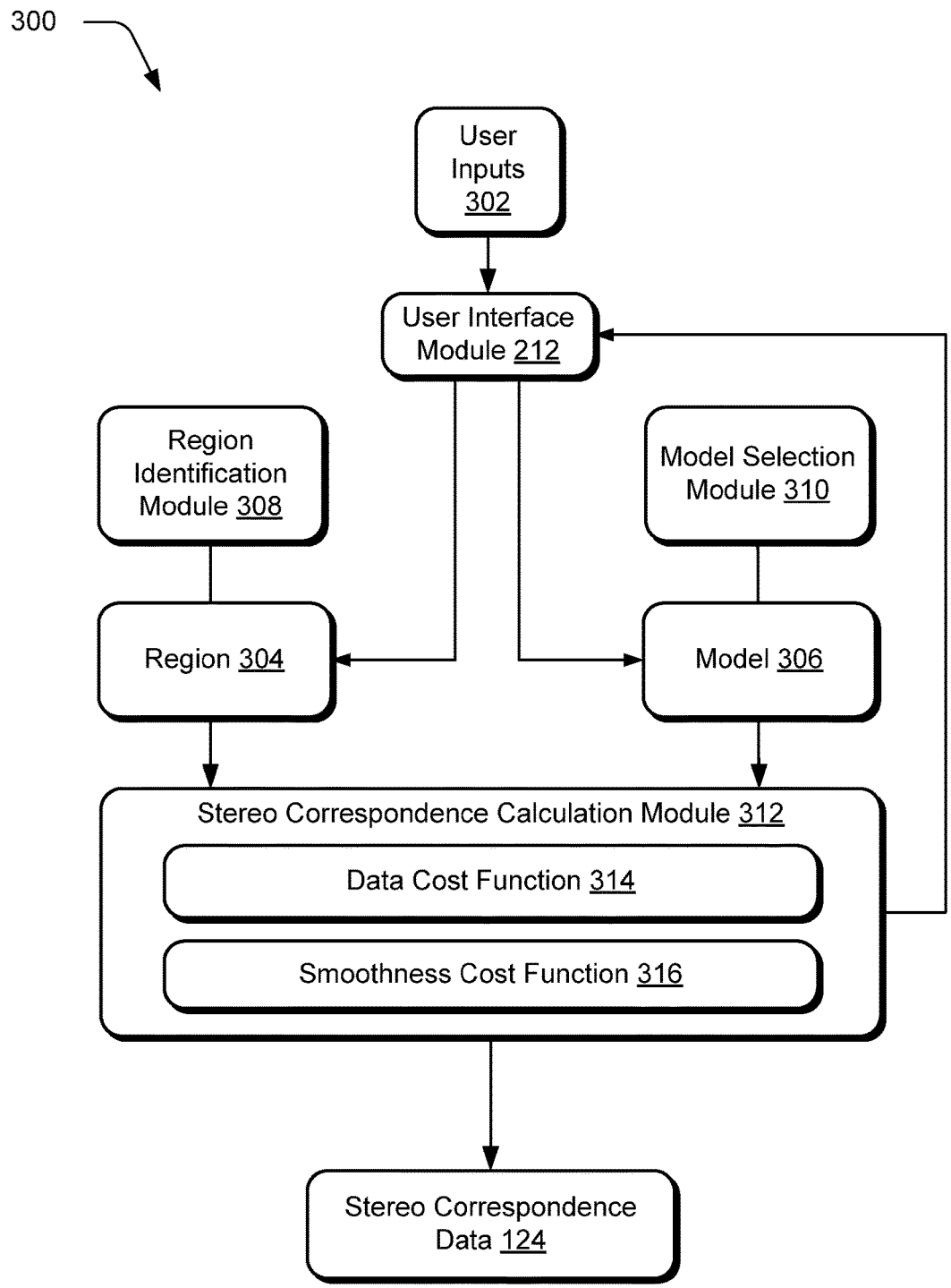
FIG. 3 depicts a system in an example implementation in which functionality that may be employed by the stereo correspondence module of FIG. 1 to compute stereo correspondence is illustrated through use of a plurality of modules.

FIG. 3 depicts a system 300 in an example implementation in which functionality that may be employed by the stereo correspondence module 122 of FIG. 1 to compute stereo correspondence is illustrated through use of a plurality of modules. The user interface module 212 is illustrated as receiving user inputs 302. The user inputs may be leveraged in a variety of ways. For example, the user inputs may be used to specify a region 304 of one or more of the images 112, 114. This may include specifying correspondence of particular pixels of the images 112, 114 to each other. This may also include identifying a particular region in one or more of the images 112, 114 to which a model is to be fit, examples of which are shown and described in relation to FIGS. 4-7.

The user interface output by the user interface module 212 may also be configured to support user selection of a model 306. The user interface, for instance, may be configured to output representations of a plurality of models that are available for selection. A user may then select a model, such as through a gesture, use of a cursor control device, voice command, and so on. The model 306 may then be used as part of a calculation of stereo correspondence as further described below.

Although specification of the region 304 and selection of the model 306 was described through interaction with a user interface, these actions may also be performed automatically and without user intervention. For example, a region identification module 308 may be employed that is configured to identify the region 304 automatically and without user intervention. This may include analysis of the images 112, 114 for features that may be used to determine correspondence of pixels between the images. Other examples are also contemplated, such to perform image analysis to identify objects that likely correspond to models.

In another example, a model selection module 310 may be employed to select the model 306 from a plurality of models automatically and without user intervention. The selection, for instance, may be performed based on the region 304 specified in the image, image analysis of the images 112, 114, correspondence of features between the images 112, 114, and so on. Thus, the region 304 and the model 306 may be indicated through a variety of different functionalities, e.g., through execution of a module, through interaction with a user interface, and so forth.

Regardless of how the indication of the region 304 or selection of the model 306 is performed, a stereo correspondence calculation module 312 may leverage this information in the calculation of stereo correspondence data 124. The stereo correspondence calculation module 312, for instance, may employ one or more cost functions to generate the stereo correspondence data 124, such as to employ belief propagation and so on.

For example, "P" may represent a set of pixels in an image. "L" may be used to represent a set of labels that represent disparities. Disparities describe a difference in locations of corresponding pixels in a plurality of images, such as images 112, 114. The pixels, for instance, may define objects such as the ball 204, traffic cone 206, paper 208, and so on as shown in FIG. 2. However, pixels that define the objects may be located at different places in the images 112, 114, which is referred to as the disparity. Accordingly, disparities of pixels that are considered to correspond to each other from the images 112, 114 may be used to extract depth information from two dimensional images. This may be calculated in a variety of ways.

For instance, stereo correspondence may be formulated as a labeling problem in which "P" is a set of pixels in an image. "L" is a set of labels that represent the disparities, and therefore "L" may be defined such that "L={$L_1$, $L_2$, ..., $L_{max}$}." A value "f" is a labeling that is usable to assign a label "$f_p \in L$" to each pixel "p∈P."

Imaging planes of the images 112, 114 may be aligned in parallel, such that corresponding pixels in image 112 (e.g., "$I_{left}$" or "$I_1$" in the below discussion) correspond to pixels in image 114 (e.g., "$I_{right}$" or "$I_2$") in a same row "y". For example, correspondence of pixels in image 112 to pixels in image 114 may be described as follows:

$$I_{left}(p) \to I_{right}(p-f_p)$$

$$I_{left}(p+f_p) \to I_{right}(p)$$

Minimization of a cost function may then be performed to arrive at the stereo correspondence data 124, an example of which is described as follows:

$$E(f) = \sum_{p \in P} D(f_p) + \sum_{(p,q) \in N} V(f_p - f_q)$$

The above cost function "E(f)" includes two terms. The first term is a data cost as computed using a data cost function 314 that is used to measure color similarity of pixels in the images 112, 114, respectively. The data cost may be expressed as follows:

$$D_p(f_p) = \begin{cases} |I_{left}(p) - I_{right}(p - f_p)|, & p \in \text{left} \\ |I_{left}(p + f_p) - I_{right}(p)|, & p \in \text{right} \end{cases}$$

Thus, the data cost in the above expression is a measure of color similarity of a pixel in a left view (e.g., "$I_{left}$") to a corresponding pixel in the right view (e.g., "$I_{right}$"), which is represented by a color difference between them. Thus, the data cost represents similarity of pixels between a plurality of stereoscopic images, e.g., images 112, 114.

Accordingly, the data cost may be used to assign a cost based on a comparison of a pixel to another pixel between images to determine which disparity is "best" and thus indicates a likely correspondence between the pixels. The stereo correspondence data 124, for instance, may be based on an examination of pixels in a row in image 114 to compare colors to a pixel chosen from image 112. Therefore, if the colors are quite different (e.g., a white pixel from image 112 being compared to a black pixel in image 114) a cost of assigning the value of this pixel may be quite high in comparison with a pixel that is closer in color. Although costs are described, other techniques may also be employed, such as through use of thresholds, sum of squared differences, and so on.

The cost function "E(f)" also includes a second term, which represents a smoothness cost as calculated using a smoothness cost function 316. The smoothness cost is based on an assumption that values of neighboring pixels are close. Accordingly, the smoothness cost of the energy function may be used to assign a cost based on similarity of a pixel to other pixels in the neighborhood of the pixel in the image, e.g., image 112 or image 114. Thus, the smoothness cost is based on consistency within the image, itself, as shown in the following expression:

$$V(f_p - f_q) = \min(c|f_p, f_q|, t)$$

A pairwise label cost is represented as "|$f_p, f_q$|" in the above expression. This calculation is generally performed for a neighborhood "N" for a pixel in question. In the above expression, a truncated linear model is employed is in which a cost increases linearly based on a different between labels "$f_p$" and "$f_q$" up to a level "t." Other examples are also contemplated.

As previously described, ambiguities may be encountered in calculating the stereo correspondence data 124 in areas that include a lack of textures or features (e.g., a white wall), repeated patterns (e.g., a checkerboard), shadows, viewpoint changes, and so on. Accordingly, techniques are described herein in which the stereo correspondence calculation module 312 may fit a model 306 to a region 304 to assist in computation of disparities for that region.

Figure 4:
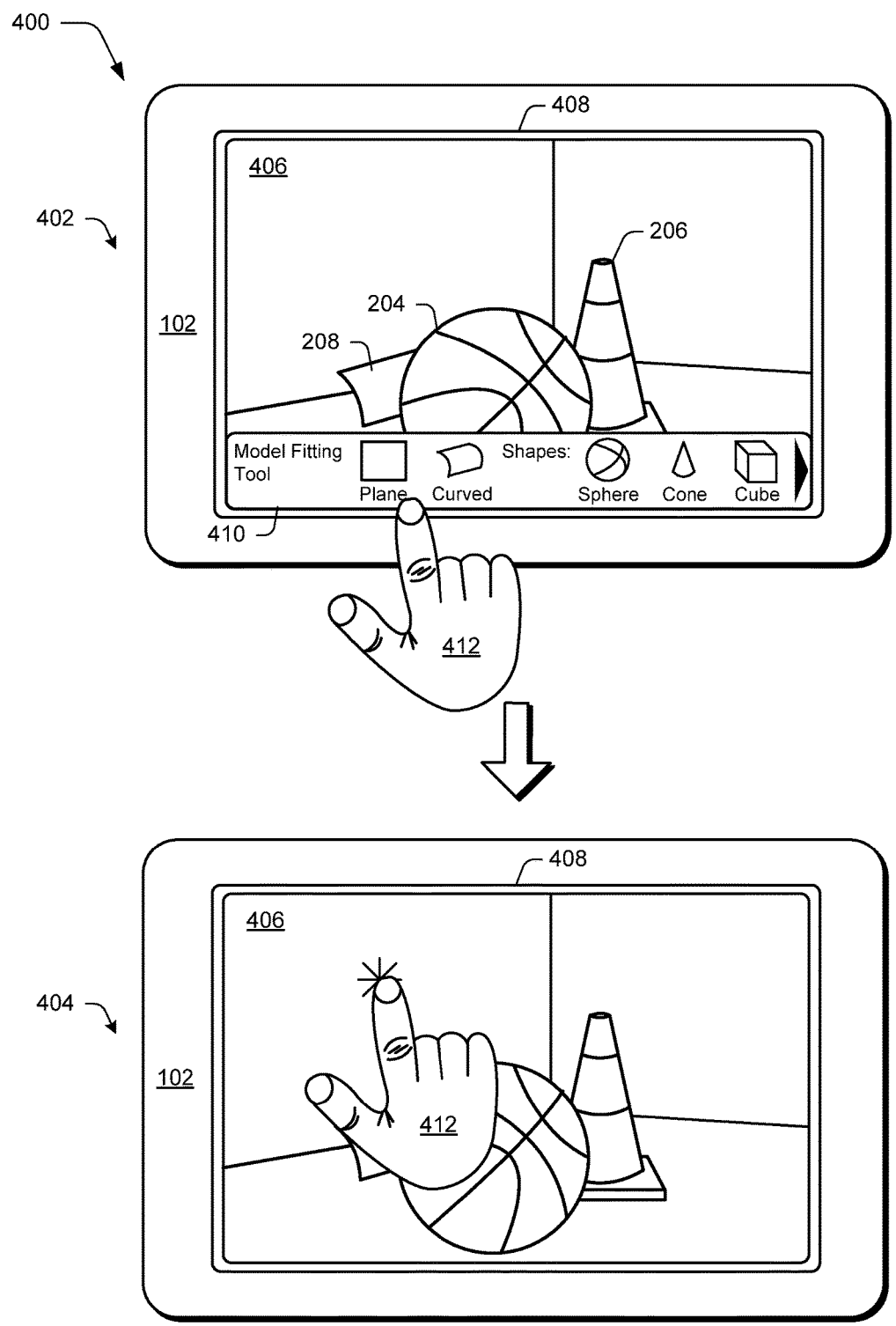
FIG. 4 depicts an example implementation in which a computing device of FIG. 1 is illustrated as outputting a user interface through use of the user interface module of FIG. 2.

FIG. 4 depicts an example implementation 400 in which a computing device 102 of FIG. 1 is illustrated as outputting a user interface through use of the user interface module 212 of FIG. 2. This example implementation is illustrated using first and second stages 402, 404.

At the first stage 402, a user interface 406 is illustrated as being output and displayed by a display device 408. The user interface 406 includes a display of at least one of a plurality of stereoscopic images, e.g., image 112, which includes image data showing the ball 204, traffic cone 206, and paper 208 of the image scene 116 of FIG. 1.

The user interface 406 is also illustrated as including a display of a menu 410 having representations of models that are user selectable. A variety of different types of models may be represented. For example, models may be represented that are to be used to model a surface, such as a plane and curved surface (e.g., quadratic surface) models in the illustrated instance.

Models may also be employed to represent other three-dimensional objects, illustrated examples of which include a sphere, cone, and cube although other examples of geometric shapes are also contemplated, such as cylinders and so on. For instance, complex geometric shapes may also be modeled, such as for a chair, particular types of chairs, vehicles, animals, users, and so forth.

In the illustrated example, a finger of a user's hand 412 is used to select a representation of a model of a plane by using a gesture. Other examples are also contemplated, such as through use of a cursor control device, voice command, and so forth. Thus, at the first stage 402 a user interacts with the user interface 406 to indicate the model 306. As previously described though, techniques may also be utilized that do not involve user interaction.

Figure 6:
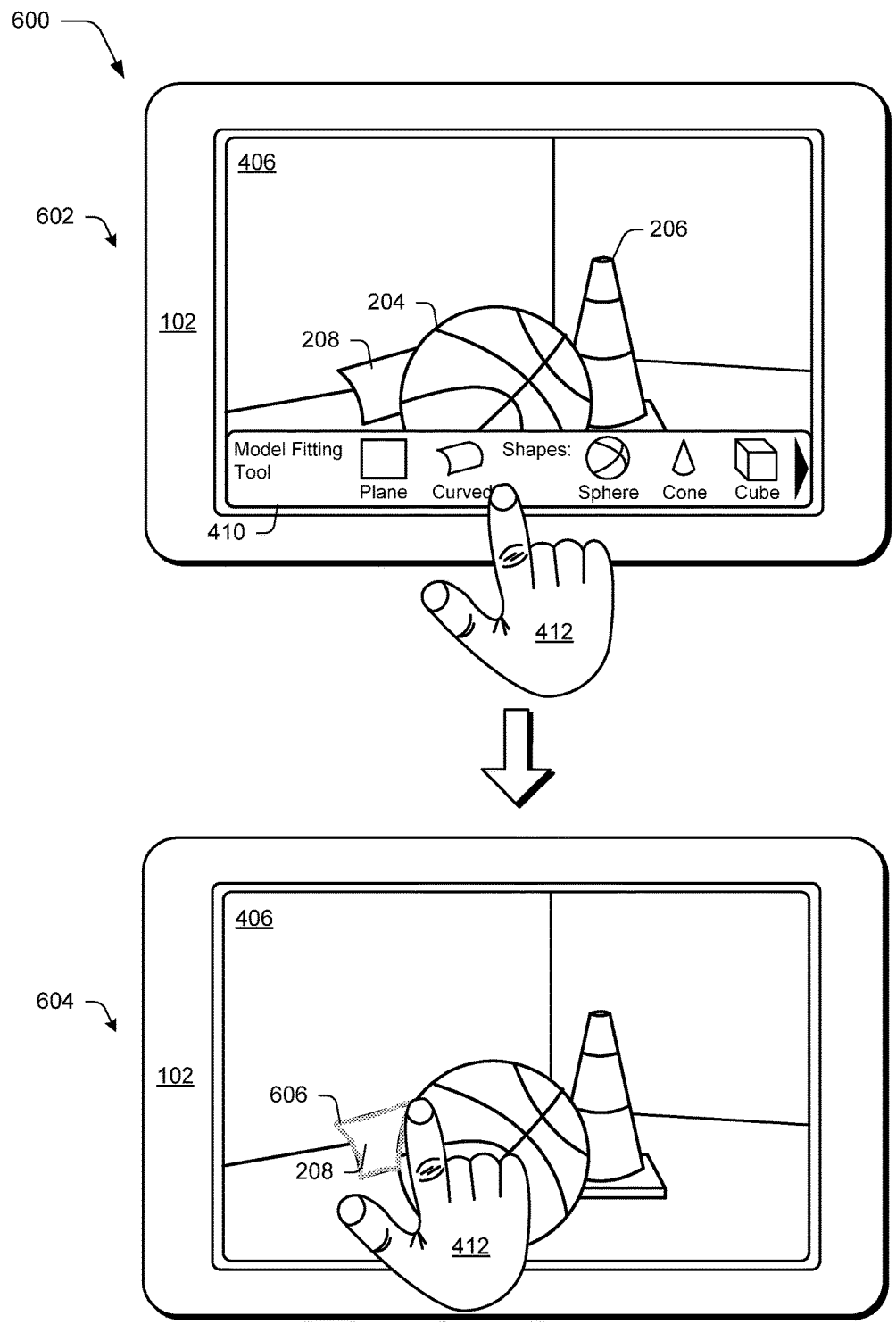
FIG. 6 depicts an example implementation in which a computing device of FIG. 1 is illustrated as outputting a user interface through use of the user interface module of FIG. 2 that is configured to select a model of a curved surface.
Figure 7:
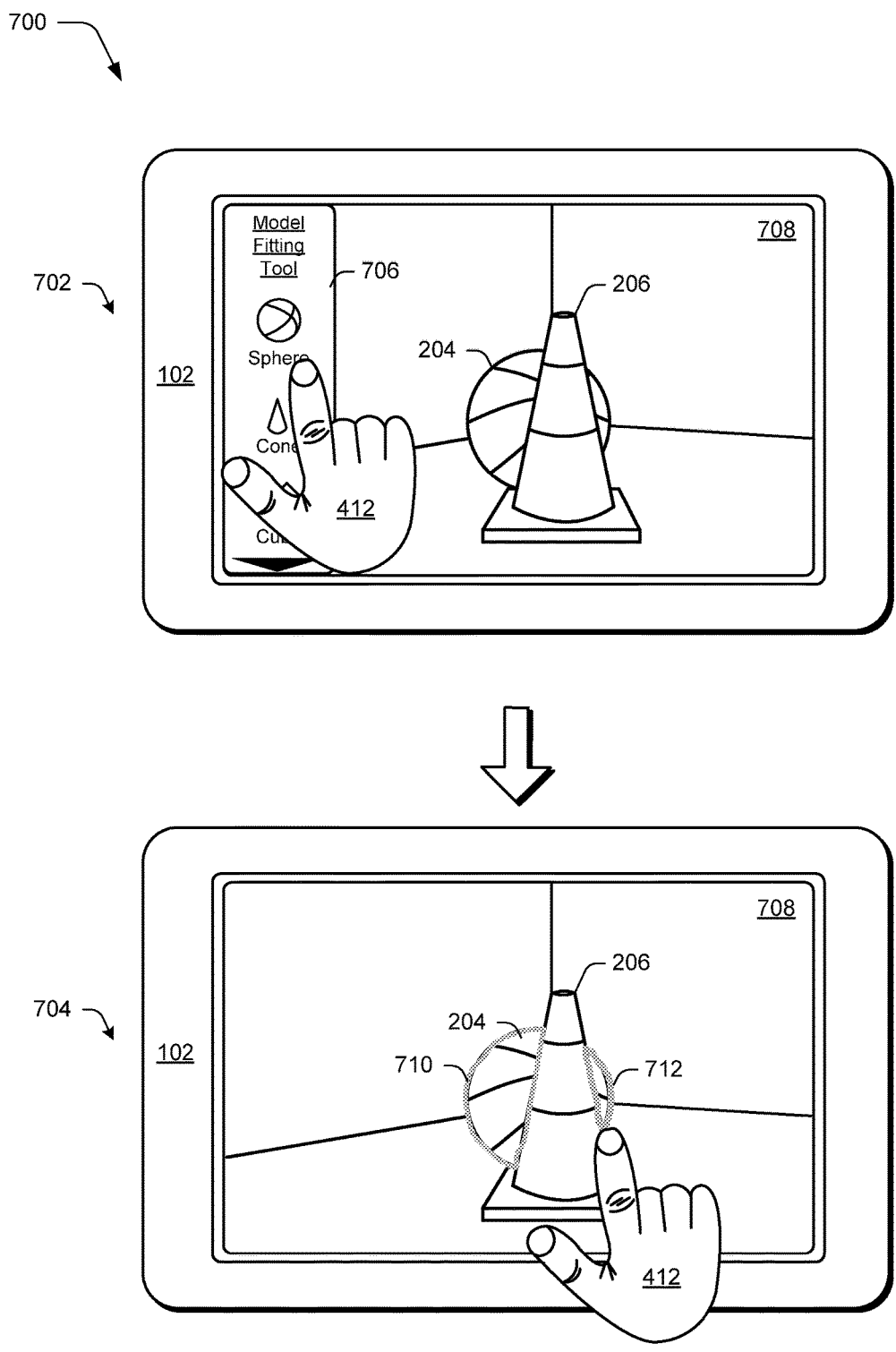
FIG. 7 depicts an example implementation in which a computing device of FIG. 1 is illustrated as outputting a user interface through use of the user interface module of FIG. 2 that is configured to select a model of a sphere.

At the second stage 404, a user is illustrated as indicating a region of the image 112 displayed in the user interface that is to correspond to the model selected in the first stage 402. In this example, a tap gesture is shown in which a finger of the user's hand 412 taps a portion of the user interface having a display of a wall. Other examples are also contemplated, such as the drawing of a line that follows a dimension of the plane, drawing a boundary to define the region as shown in FIGS. 6 and 7, and so on. Thus, in this way a user may interact with the user interface to indicate a region 304 to which the model 306 is to be fit.

The stereo correspondence calculation module 312 may then use this information to generate the stereo correspondence data 124. Continuing with the above example, let "(u,v)" represent an image coordinate for a pixel and "disp" represent the corresponding disparity of "(u,v)." The model for a plane may then be used to calculate the disparity as follows:

$$disp = au + by + c$$

In this way, disparities in the region 304 may be biased towards the model of a plane. This calculation may also take into account an indication of correspondence of pixels between the images, an example of which is described as follows and shown in a corresponding figure.

Figure 5:
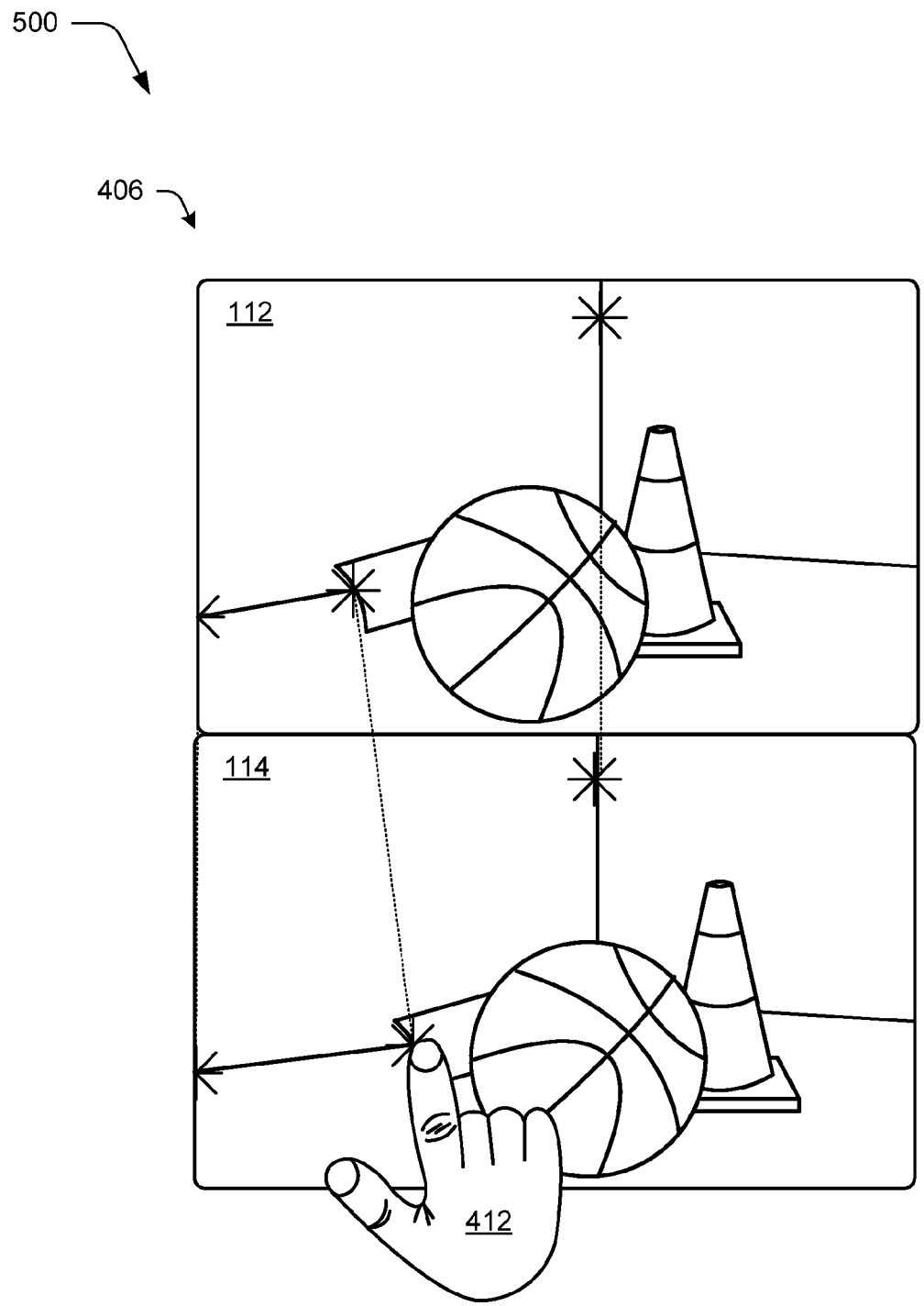
FIG. 5 depicts an example implementation in which a user interface is configured to support user interaction to indicate correspondence of pixels between a plurality of images.

FIG. 5 depicts an example implementation in which the user interface 406 is configured to support user interaction to indicate correspondence of pixels between a plurality of images. In this example, the user interface 406 displays a plurality of stereoscopic images 112, 114 simultaneously, although other examples are also contemplated such as sequential display.

The user interface 406 is configured such that a user may indicate that pixels correspond to each other in the images 112, 114. This is illustrated in FIG. 5 through the use of stars which indicate selection of pixels and a dashed line to indicate which selections correspond. This selection may be performed in a variety of ways, such as by a tap of a user's finger 412 as a gesture as illustrated, through use of a cursor control device, and so on.

In another example, the user interface 406 may be configured to output a result of an analysis performed automatically and without user intervention to suggest correspondence of pixels. The stereo correspondence module 122, for instance, may examine the images 112, 114 to locate features that likely correspond between the images.

Indications of the likely correspondence of the features may then be output in the user interface 406, such as through display of stars at corresponding points. A user may then interact with the user interface 406 to verify the correspondence. This may include removal of indications of features that do not correspond, selecting indications that do correspond, adding addition indications of correspondence, and so on.

Regardless of how the correspondence is indicated, these selections may then be used as constraints such that for each pixel in the region 304 for that model 306 (e.g., the plane), a data cost for the predicted disparity value as indicated by the model 306 is reduced. This may include at the value itself as well as to values that are "close" to the value. For example, the reduction in the data cost may be configured based on how closely the disparity values correspond to the model 306. A variety of other examples are also contemplated.

Accordingly, user constraints may also be incorporated into the calculation such that for each pixel in that plane, a predicted disparity value is suggested by the model of the plane. Therefore, data costs for the predicted disparity value may be decreased based on correspondence to the model, e.g., the plane in this example. For pixels "p∈plane", "$d_p$ (plane)" may be used to represent the disparity predicted by the model of the plane. Accordingly, disparity may be calculated in reference to the model of the plane using the following expression:

$$D_p(d_p(\text{plane})) = D_p(d_p(\text{plane})) - \delta$$

In the above expression, "δ" represents a large positive number that is utilized to decrease the data cost for disparities that correspond to disparities that are predicted based on the model. In this way, disparities that correspond to the model of the plane have a reduced data cost. In this example, an example of a gesture was described to specify the region 306. Other examples are also contemplated in which a gesture or other input may be used to define a boundary of a region that is to be used to fit a model, an example of which is described as follows and shown in the corresponding figure.

FIG. 6 depicts an example implementation 600 in which a computing device 102 of FIG. 1 is illustrated as outputting a user interface 406 through use of the user interface module 212 of FIG. 2 that is configured to select a model of a curved surface. This example implementation is also illustrated using first and second stages 602, 604.

At the first stage 602, a user is illustrated as selecting a model of a curved surface from the menu 410 as before. At the second stage 604, a user is illustrated as defining a boundary 606 of a region to which the selected model is to be fit. In this example, the user interface 406 is configured to provide an indication of where the user has selected such that the user is given feedback regarding the specification of the region. For instance, the indication may be output as a user "draws" the boundary 606 to define the region.

A model 306 of a curved surface may then be fit to the region 304 indicated by the boundary 606, e.g., the piece of paper 208 in this example. This may be performed in a variety of ways, such as through use of a model that defines a quadratic surface. Continuing with the previous example, a model 306 of a quadratic surface is to be fit to the region 304. Image coordinates may be represented as "(u,v)" and "d" may be used to represent the corresponding disparity of "(u,v)." A three dimensional position of a point in a camera coordinate system may be represented as values "(X,Y,Z)." The values "focal" and "baseline" correspond to a focal length and baseline of an image capture device, e.g., stereo camera, and the values "$c_x$" and "$c_y$" represent a corresponding center of projection.

A two dimension image coordinate "(u,v)" may then be back projected to the three dimensional camera coordinate "(X,Y,Z)" to arrive at the following expression:

$$X = \frac{Z}{\text{focal}}(u - c_x), Y = \frac{Z}{\text{focal}}(v - c_y), Z = \frac{\text{baseline} \cdot \text{focal}}{disp}$$

Accordingly, a quadratic surface model may be expressed as follows:

$$aX^2+bY^2+cZ^2+dXY+eXZ+fYZ+gX+hY+iZ+k=0$$

As before, user constraints may also be employed as part of the calculation. In this example, a single region was defined by a user in which a model was to be fit. Additional examples are also contemplated in which a plurality of regions are defined to fit a model, an example of which is described as follows and shown in the corresponding figure.

FIG. 7 depicts an example implementation 700 in which a computing device 102 of FIG. 1 is illustrated as outputting a user interface through use of the user interface module 212 of FIG. 2 that is configured to select a model of a sphere. This example implementation is also illustrated using first and second stages 702, 704. At the first stage 702, a user's hand 412 is illustrated as selecting a model of a sphere from a menu 706 output in a user interface 708.

At the second stage 704, a user is illustrated as drawing a plurality of boundaries to define regions to which the model of the sphere is to be fit. In the illustrated example, the ball 204 is positioned behind the traffic cone 206 such that the traffic cone 206 occludes a center portion of the ball 204. Therefore, a user is illustrated as defining a plurality of regions 710, 712 that correspond to the ball 204. The plurality of regions may then be used to fit the model of the sphere for calculation of stereo correspondence.

A model 306 of a sphere may then be fit to the region 304 indicated by the plurality of regions 710, 712, e.g., the ball 204 in this example. This may be performed in a variety of ways, such as through use of a model that defines a sphere as before. Continuing with the previous example, a model 306 of a sphere is to be fit to the plurality of regions 710, 712 indicated by the boundaries. Image coordinates may be represented as "(u,v)" and "d" may be used to represent the corresponding disparity of "(u,v)." A three dimensional position of a point in a camera coordinate system may be represented as values "(X,Y,Z)." The values "focal" and "baseline" correspond to a focal length and baseline of an image capture device, e.g., stereo camera, and the values "$c_x$" and "$c_y$" represent a corresponding center of projection as before.

A two dimension image coordinate "(u,v)" may then be back projected to the three dimensional camera coordinate "(X,Y,Z)" to arrive at the following expression:

$$X = \frac{Z}{\text{focal}}(u - c_x), Y = \frac{Z}{\text{focal}}(v - c_y), Z = \frac{\text{baseline} \cdot \text{focal}}{disp}$$

The model of the sphere may be expressed as follows:

$$(X-x_0)^2+(Y-y_0)^2+(Z-z_0)^2=r^2$$

where "$(x_0,y_0,z_0)$" is the center of the sphere and "r" is the radius.

Expansion of this equation may be performed to arrive at the following expression:

$$X^2+Y^2+Z^2-2x_0X-2y_0Y-2z_0Z+x_0^2+y_0^2+z_0^2-r^2=0$$

which may also be expressed in the following form:

$$X^2+Y^2+Z^2+hX+iY+jZ+k=0$$

As before, additional indications of user constraints may also be employed as part of the calculation. Although examples of models were described, it should be readily apparent that a wide variety of other models and techniques to specify regions may also be employed without departing from the spirit and scope thereof, further discussion of which may be found in relation to the following discussion of the procedures.

Example Procedures

The following discussion describes stereo correspondence model fitting techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-7.

FIG. 8 depicts a procedure 800 in an example implementation in which a model is used as part of a calculation of stereo correspondence. An indication is received that pixels correspond to each other, the pixels included in respective one of a plurality of stereoscopic images (block 802). This indication may be generated in a variety of ways. For example, the indication may be based on a computation of the correspondence of the pixels automatically and without user intervention (block 804), such as through use of a region identification module 308.

In another example, a user interface may be output that includes the indication of the pixels that correspond to each other, the user interface configured to support user interaction to verify the correspondence (block 806) as previously described in relation to FIG. 5. In a further example, a user interface may be output that is configured to support user interaction to generate the indication that the pixels correspond to each other (block 808), such as to specify corresponding regions in the images 112, 114 as shown in relation to FIGS. 4-7. Other examples are also contemplated.

A model is fit to the plurality of stereoscopic images based at least in part on the indication of the correspondence of the one or more pixels to each other (block 810). As previously described, the model may be selected in a variety of ways. For example, the model may be selected from a plurality of models automatically and without user intervention (block 812), such as through execution of the model selection module 310. A user interface may also be output that is configured to support user interaction to select the model from a plurality of models (block 814) as shown and described in relation to FIGS. 4-7.

Stereo correspondence is calculated of image data of the plurality of stereoscopic images, the calculating performed using disparities for pixels that are determined at least in part based on the model (block 816). The model, for instance, may be used to predict disparities that may be used to bias a cost function. Other examples are also contemplated without departing from the spirit and scope thereof as previously described.

Figure 9:
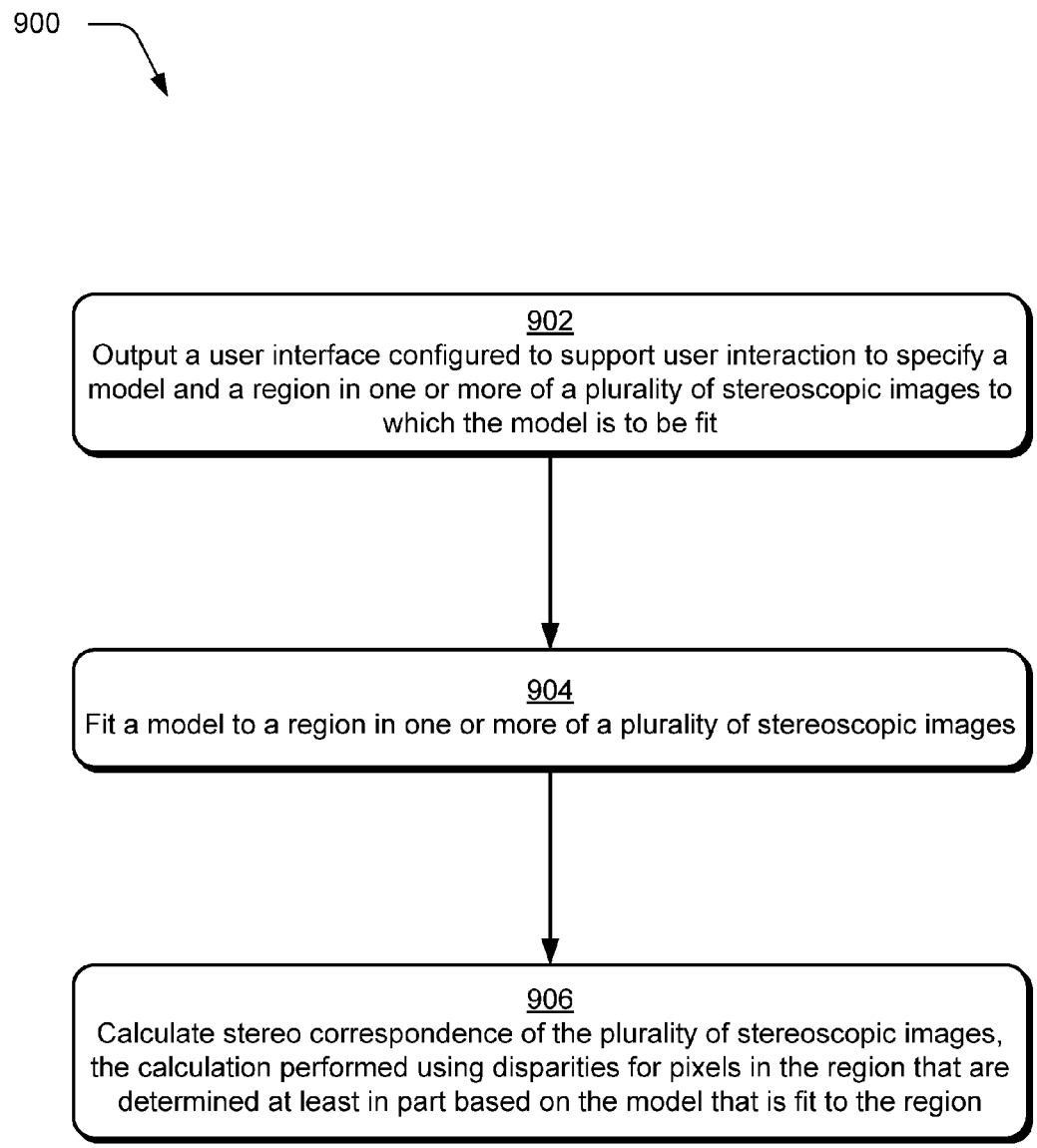
FIG. 9 is a flow diagram depicting a procedure in an example implementation in which a model selected by a user is fit to a regions specified by the user to be used as part of a calculation of stereo correspondence.

FIG. 9 depicts a procedure 900 in an example implementation in which a model selected by a user is fit to a regions specified by the user to be used as part of a calculation of stereo correspondence. A user interface is output that is configured to support user interaction to specify a model and a region in one or more of a plurality of stereoscopic images to which the model is to be fit (block 902). As shown in FIGS. 4-7, for instance, a user may select a representation of a model and also interact with an output of an image to specify a region in the image to which the model is to be fit.

The model may then be fit to the region in the one or more of the plurality of stereoscopic images (block 904) as previously described in relation to FIG. 4. Stereo correspondence may then be calculated of the plurality of stereoscopic images using disparities for pixels in the region that are determined at least in part based on the model that is fit to the region (block 906). As previously described, this may include use of a cost or other function that may be used to bias disparities for pixels in the region to disparities predicted by the model. Other examples are also contemplated.

Example System and Device

Figure 10:
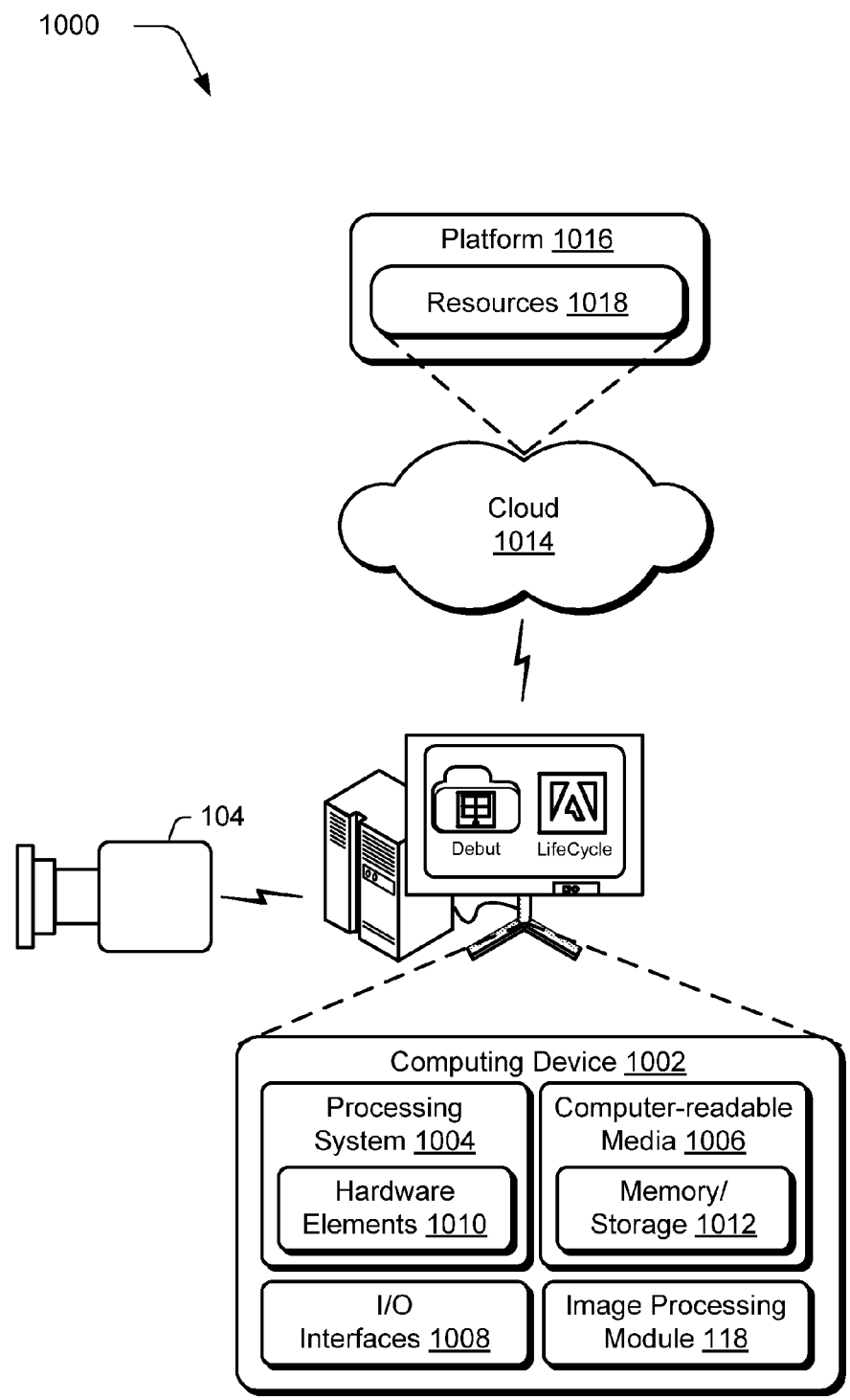
FIG. 10 illustrates an example system including various components of an example device that can be implemented as any type of computing device as described and/or utilize with reference to FIGS. 1-9 to implement embodiments of the techniques described herein.

FIG. 10 illustrates an example system generally at 1000 that includes an example computing device 1002 that is representative of one or more computing systems and/or devices that may implement the various techniques described herein. This is illustrated through inclusion of the image processing module 118, which may be configured to process image data, such as image data captured by an image capture device 104. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interface 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1006 is illustrated as including memory/storage 1012. The memory/storage 1012 represents memory/storage capacity associated with one or more computer-readable media. The memory/storage component 1012 may include volatile media (such as random access memory (RAM)) and/or nonvolatile media (such as read only memory (ROM), Flash memory, optical disks, magnetic disks, and so forth). The memory/storage component 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of a module that is executable by the computing device 1002 as software may be achieved at least partially in hardware, e.g., through use of computer-readable storage media and/or hardware elements 1010 of the processing system 1004. The instructions and/or functions may be executable/operable by one or more articles of manufacture (for example, one or more computing devices 1002 and/or processing systems 1004) to implement techniques, modules, and examples described herein.

The techniques described herein may be supported by various configurations of the computing device 1002 and are not limited to the specific examples of the techniques described herein. This functionality may also be implemented all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 may include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 may abstract resources and functions to connect the computing device 1002 with other computing devices. The platform 1016 may also serve to abstract scaling of resources to provide a corresponding level of scale to encountered demand for the resources 1018 that are implemented via the platform 1016. Accordingly, in an interconnected device embodiment, implementation of functionality described herein may be distributed throughout the system 1000. For example, the functionality may be implemented in part on the computing device 1002 as well as via the platform 1016 that abstracts the functionality of the cloud 1014.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by at least one computing device, the method comprising:
    selecting a model from a plurality of models automatically and without user intervention by the at least one computing device, the selecting based at least in part on an indication that pixels included in respective ones of a plurality of stereoscopic images correspond to each other;
    fitting the model to the plurality of stereoscopic images by the at least one computing device based at least in part on the indication that the pixels correspond to each other;
    calculating stereo correspondence of image data of the plurality of stereoscopic images by the at least one computing device, the calculating based on minimizing a cost function determined from disparities indicating a difference in locations of the pixels, the disparities determined at least in part based on the model, the cost function including a first cost of color similarity in the pixels that correspond to each other in the stereoscopic images and a second cost of smoothness of neighboring pixels in one of the stereoscopic images; and
    determining, based on the stereo correspondence, a region of one of the plurality of stereoscopic images that corresponds to another region of an additional one of the plurality of stereoscopic images.

2. The method as described in claim 1, further comprising computing the correspondence of the pixels included in the respective ones of the plurality of stereoscopic images automatically and without user intervention.

3. The method as described in claim 2, wherein the computing of the correspondence of the pixels is based at least in part on identification of features in the plurality of stereoscopic images.

4. The method as described in claim 2, further comprising outputting a user interface that includes the indication of the pixels that correspond to each other, the user interface configured to support user interaction to verify the correspondence.

5. The method as described in claim 4, wherein the user interface is configured to remove the indication that the pixels correspond to each other.

6. The method as described in claim 1, further comprising outputting a user interface that is configured to support user interaction to generate the indication that the pixels correspond to each other.

7. The method as described in claim 6, wherein the user interface is configured to support the user interaction by detecting selection of a plurality of different individual locations in respective ones of the plurality of stereoscopic images.

8. The method as described in claim 6, wherein the user interface is configured to support the user interaction by detecting selection of a boundary in respective ones of the plurality of stereoscopic images.

9. The method as described in claim 1, further comprising outputting a user interface that is configured to change the automatically selected model.

10. The method as described in claim 1, wherein the model describes a three-dimensional object.

11. The method as described in claim 1, wherein the model describes a surface.

12. The method as described in claim 1, wherein the calculating is further based on a weight based on correspondence to the model.

13. A system comprising:
at least one module implemented at least partially in hardware, the at least one module configured to output a user interface to support user interaction to specify a plurality of models and regions in one or more of a plurality of stereoscopic images to which the respective models are to be fit; and
one or more modules implemented at least partially in hardware, the one or more modules configured to:
calculate stereo correspondence of the regions of the plurality of stereoscopic images, the calculation based on minimizing a cost function determined from disparities indicating a difference in locations of pixels in the regions, the disparities determined at least in part based on the respective models that are fit to the regions, the cost function including a first cost of color similarity in pixels that correspond to each other in the stereoscopic images and a second cost of smoothness of neighboring pixels in one of the stereoscopic images; and
determine, based on the stereo correspondence, a region of one of the plurality of stereoscopic images that corresponds to another region of an additional one of the plurality of stereoscopic images.

14. The system as described in claim 13, wherein the user interface is configured to support user interaction to specify the regions by indicating correspondence of pixels between the plurality of stereoscopic images.

15. The system as described in claim 13, wherein the respective models describe a surface or a three dimensional object.

16. A method implemented by at least one computing device, the method comprising:
outputting, by the computing device, a user interface that is configured to support user interaction to select a model from a plurality of models integrated within an application corresponding to the user interface;
fitting, by the computing device, the model to the plurality of stereoscopic images based at least in part on an indication that pixels included in respective ones of a plurality of stereoscopic images correspond to each other;
calculating, by the computing device, stereo correspondence of image data of the plurality of stereoscopic images, the calculating based on minimizing a cost function determined from disparities indicating a difference in locations of the pixels, the disparities determined at least in part based on the model, the cost function including a first cost of color similarity in the pixels that correspond to each other in the stereoscopic images and a second cost of smoothness of neighboring pixels in one of the stereoscopic images; and
determining, based on the stereo correspondence, a region of one of the plurality of stereoscopic images that corresponds to another region of an additional one of the plurality of stereoscopic images.

17. The method as described in claim 16, further comprising computing the correspondence of the pixels included in the respective one of the plurality of stereoscopic images automatically and without user intervention.

18. The method as described in claim 17, further comprising outputting a user interface that is configured to support user interaction to generate the indication that the pixels correspond to each other.

19. The method as described in claim 16, wherein the calculating is further based on a weight based on correspondence to the model.

20. The system as described in claim 13, wherein the user interface is configured to support the user interaction by detecting selection of a boundary in respective ones of the plurality of stereoscopic images.

* * * * *